INVENTORS
CLARENCE WANTZ
ROBERT L. GOLDEN
BY

THEIR ATTORNEYS

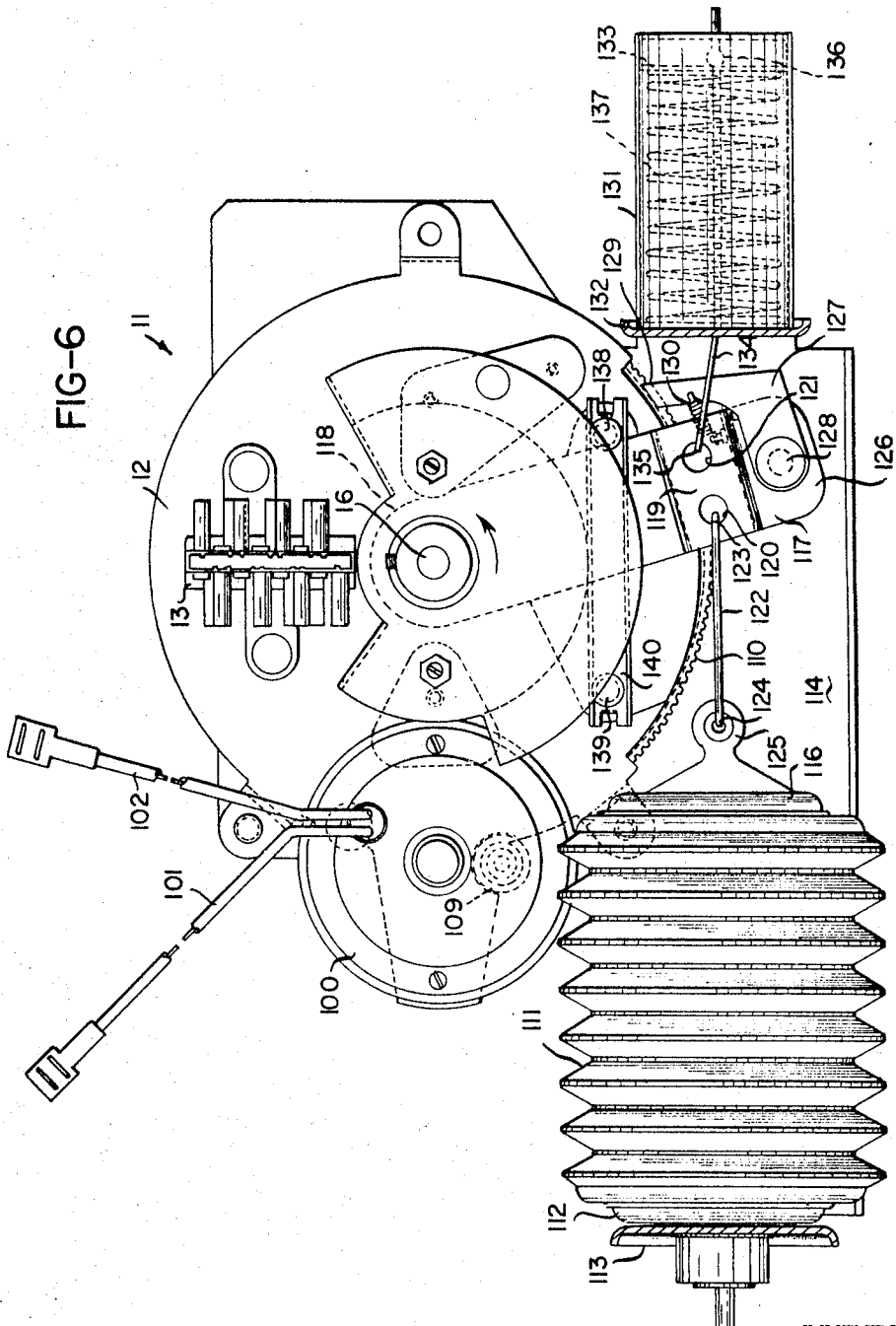

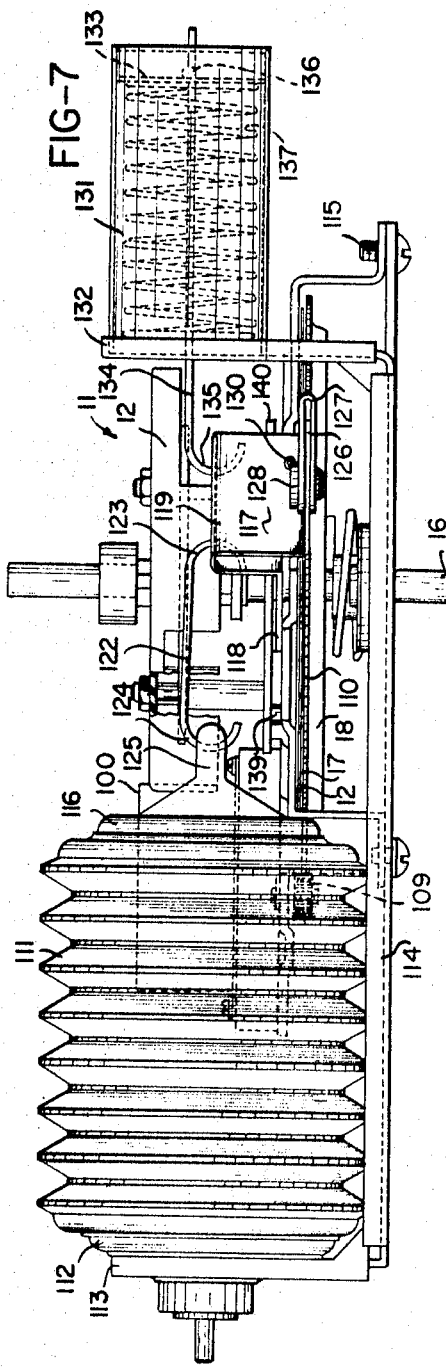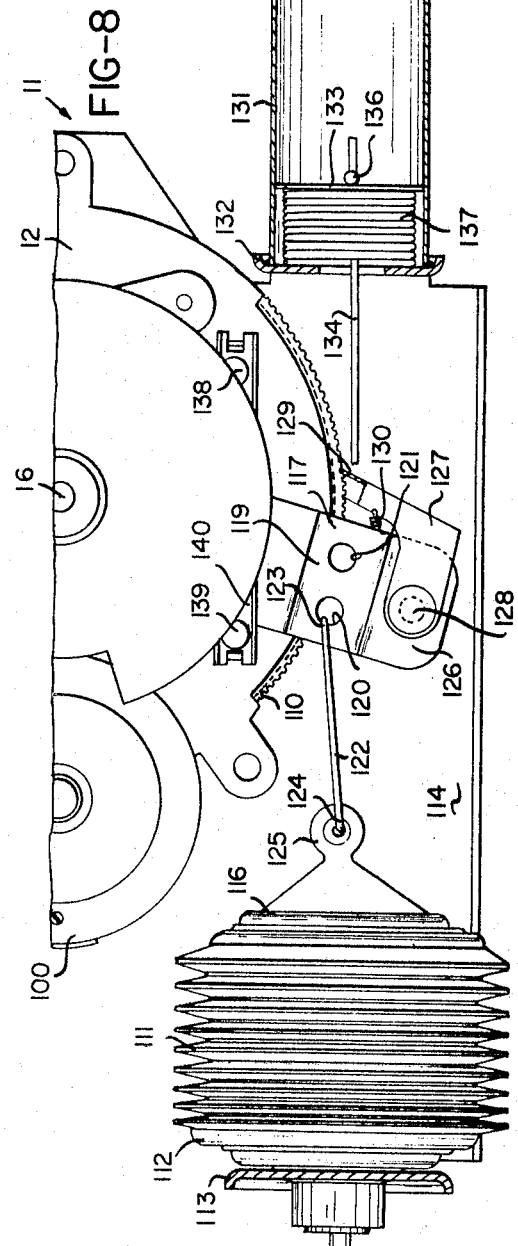

United States Patent Office 3,454,784
Patented July 8, 1969

3,454,784
METHOD FOR CONTROLLING THE OPERATION OF ACTUATOR MEANS OR THE LIKE
Clarence Wantz, Rolling Meadows, Ill., and Robert L. Golden, Greensburg, Pa., assignors to Robertshaw Controls Company, Richmond, Va., a corporation of Delaware
Original application June 21, 1963, Ser. No. 289,599, now Patent No. 3,255,672. Divided and this application May 12, 1966, Ser. No. 549,643
Int. Cl. H01h 7/00
U.S. Cl. 307—141
10 Claims

ABSTRACT OF THE DISCLOSURE

This disclosure relates to the method of controlling the operation of a plurality of actuators in a predetermined pattern by moving a program controlling member at a predetermined rate by a timer means to actuate each of the actuators for a predetermined time in a predetermined sequence, the method including an overriding means which when actuated will rapidly move the program controlling member at a rate faster than the predetermined rate provided by the timer means so as to decrease the predetermined time of actuation of at least one of the actuators even though the timer means is still tending to move the program control member at its predetermined rate.

---

This application is a divisional application of its copending patent application, Ser. No. 289,599, filed June 21, 1963, now U.S. Patent No. 3,255,672.

This invention relates to an improved program controlled system and to improved methods for controlling such a system or the like as well as to improved parts for such a system or the like.

It is well known that a domestic appliance or other desired apparatus can have the various actuators thereof actuated in a predetermined pattern by utilizing a program controlling member which is driven at a predetermined rate to selectively interconnect a vacuum source to a particular actuator at a desired time to actuate that actuator for a desired period of time and in the desired sequence relative to the operation of the other actuators whereby the operation of the apparatus is automatically controlled by the program member.

For example, such a vacuum program controlling system is fully disclosed in the copending patent application of Beck et al., Ser. No. 153,300, filed Nov. 20, 1961, and entitled, "Pneumatic Programmer," now abandoned in favor of its copending continuation application Ser. No. 347,882, filed Feb. 27, 1964, and now U.S. Patent No. 3,286,730.

In such a system, the program controlling member has particular portions thereof moved past a predetermined point at a predetermined rate to cause actuation of the actuators for predetermined times to provide the particular cycles of the system.

One of the features of this invention is to provide means for selectively varying the period of time of actuation of at least one of the actuators controlled by the program controlling member.

For example, in a conventional washing apparatus, such as a dishwasher or a washing machine, it is desirous that the particular washing cycle thereof be so selective that the user can have the wash cycle appreciatively shortened for normal loads while still permitting a relatively long wash cycle for relatively heavy loads.

Accordingly, one of the features of this invention is to provide a means and a method for selectively varying the operation of a program controlling member or the like in such a manner that the program controlling member can selectively provide a relatively long period of actuation of a particular actuator while still being adapted to selectively provide a shorter period of actuation of that particular actuator without affecting the normal operation of the other actuators of the system.

Another feature of this invention is to provide means for automatically returning the program controlling member or the like to its starting position after the program controlling member has completed the predetermined pattern of operation of the system.

In one embodiment of this invention this automatic resetting of the program controlling member or the like is accomplished by the same means that provides the selective operation of the program controlling member in varying the period of time of actuation of at least one of the actuators of the system.

In addition, this invention provides means wherein the deactuation of a particular actuator of the system can be controlled by means other than the venting of the controlling chamber of a particular actuator through the venting means of the program controlling member.

Accordingly, it is an object of this invention to provide an improved program controlled system or the like, the system having one or more of the novel features of this invention as set forth above or hereinafter shown or described.

Another object of this invention is to provide an improved method for controlling a system or the like, the method having one or more of the novel features of this invention as set forth above or hereinafter shown or described.

A further object of this invention is to provide improved parts for such system or the like.

Another object of this invention is to provide improved methods of operating such parts or the like.

Other objects, uses and advantages of this invention are apparent from a reading of this description which proceeds with reference to the accompanying drawings forming a part thereof and wherein:

FIGURE 6 is a top view of the program controlling means illustrated in FIGURE 3.

FIGURE 7 is a side view of the program controlling means illustrated in FIGURE 6.

FIGURE 8 is a fragmentary view similar to FIGURE 6 and illustrates the rapid advancement and/or resetting feature of this invention.

Figure 1:
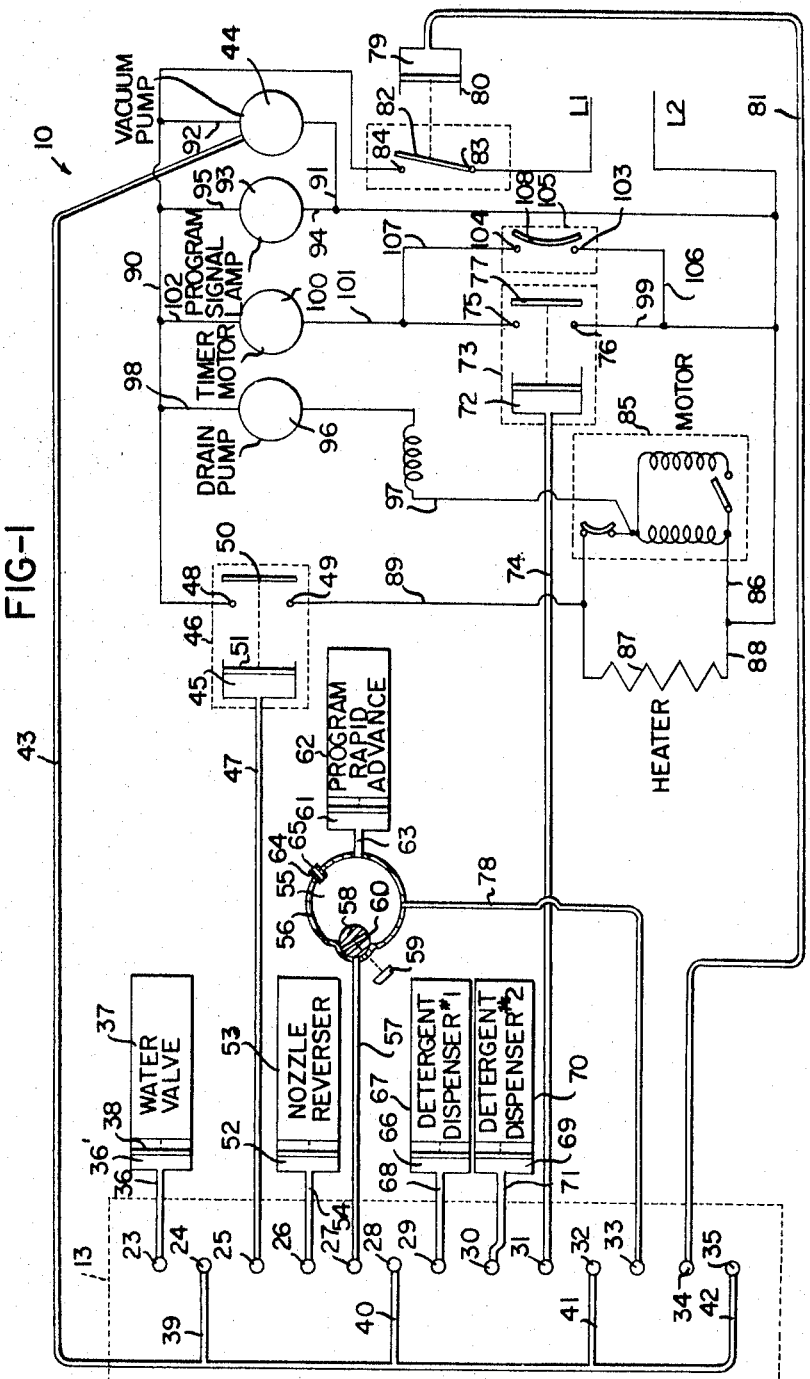
FIGURE 1 is a schematic view illustrating one typical application of the program controlled system of this invention.

While the various features of this invention are hereinafter described and illustrated as being particularly adaptable for controlling the vacuum control system of a domestic dishwasher or the like, it is to be understood that the various features of this invention can be utilized singly or in any combination thereof to provide means for controlling any other type of program controlled system or the like whether the same is utilized in an appliance or other structure as desired.

Therefore, this invention is not to be limited to only the embodiment illustrated in the drawings, because the drawings are merely utilized to illustrate one of the wide variety of uses of this invention.

Referring now to FIGURE 1, the improved program controlled system of this invention is generally indicated by the reference numeral 10 and is illustrated in connection with the various actuators of an automatic dishwasher or the like.

In particular, the various actuators of the program controlled system 10 illustrated in FIGURE 1 are controlled in a predetermined sequence by a program controlling means of this invention which is generally indicated by the reference numeral 11 in FIGURE 3, the program controlling means 11 causing the various actuators of the system 10 of FIGURE 1 to operate in a predetermined pattern in a manner hereinafter described to provide the desired cycles of operation of the automatic dishwasher or the like.

Figure 3:
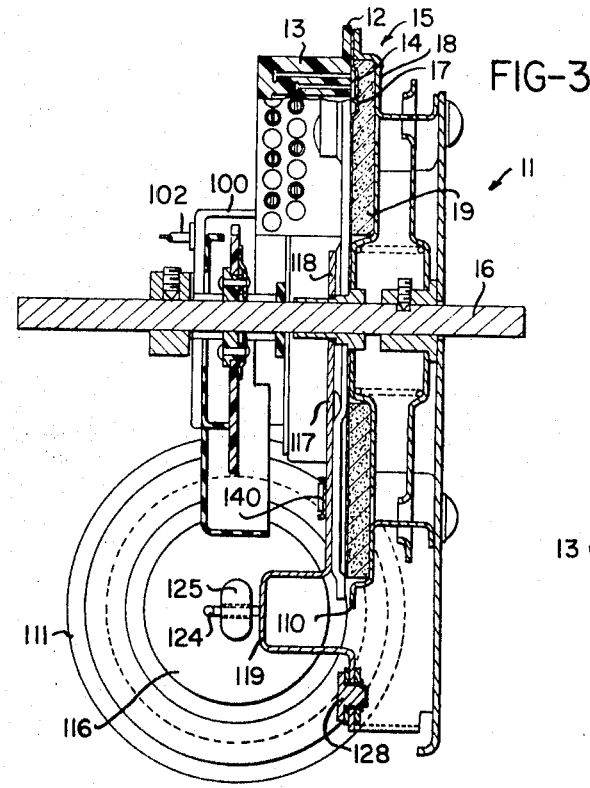
FIGURE 3 is an axial cross-sectional view of the improved program controlling means of this invention.

As illustrated in FIGURE 3, the program controlling means 11 comprises a stationary plate 12 carrying a reading head or block 13 which has a flat reading surface 14 interrupted by a plurality of ports interconnected to various actuators and a vacuum source in a manner hereinafter described. A reading member 15 is rotatably mounted to the fixed plate 12 by a shaft means 16, the rotatable reading member 15 comprising a flexible reading sheet 17 fixed to a rigid backing member 18 which cooperates with the reading sheet 17 to define a chamber therebetween that receives porous filtering means 19 for a purpose hereinafter described.

Figure 5:
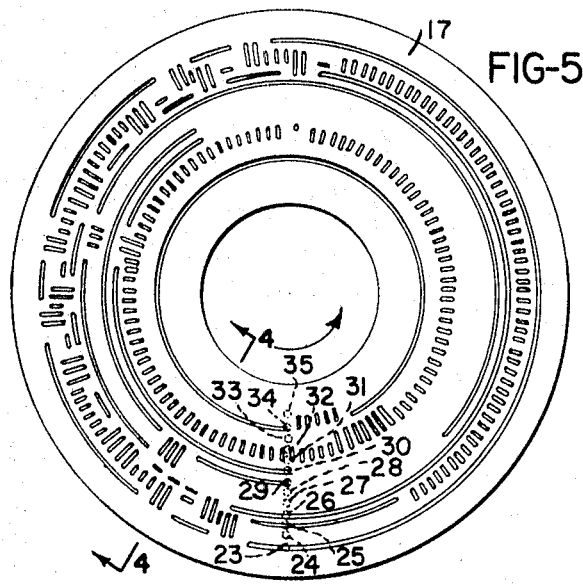
FIGURE 5 is a bottom view of the program controlling member of this invention.
Figure 4:
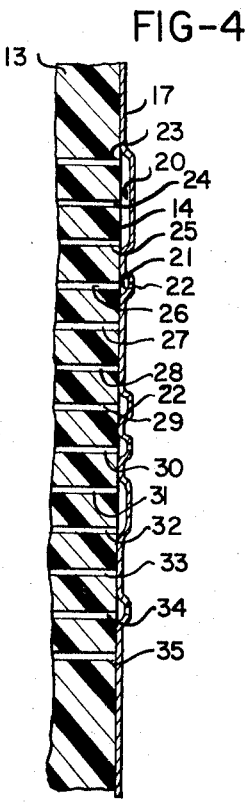
FIGURE 4 is an enlarged, fragmentary, cross-sectional view illustrating the cooperation between the reading sheet of the program controlling means of FIGURE 3 and the reading head thereof, FIGURE 4 being taken on line 4—4 of FIGURE 5.

As illustrated in FIGURES 3–5, the reading sheet 17 has a plurality of elongated blisters or inverted channels 20 formed therein and disposed substantially radially in a predetermined pattern on the sheet 17 to provide the desired sequence of operation of the system 10 in a manner hereinafter described, each blister 20 being adapted to span two or more aligned ports in the reading head 13 in a manner hereinafter described.

A plurality of closed arcuate channels or blisters 21 are also formed in the reading sheet 17 in the manner illustrated in FIGURES 4 and 5, each channel being interconnected to the other side of the sheet 17 by at least one aperture 22 through the reading sheet 17 and being interconnected with a particular channel 21 to provide venting means in a manner hereinafter described.

The reading head 13 of the program controlling means 11 of this invention has the reading surface 14 thereof interrupted by at least thirteen ports 23, 24, 25, 26, 27, 28, 29, 30, 31, 32, 33, 34 and 35 disposed in aligned relation as illustrated in FIGURES 1, 2, 4 and 5 for a purpose hereinafter described whereby the program controlling member 15 of this invention is adapted to selectively interconnect together various sets of ports in various timed relations to cause actuation of the actuators of the system 10 while the venting channels 21 thereof are adapted to deactuate the actuators of the system 10 in a predetermined manner so that the system 10 will control the operation of the dishwasher or the like in the desired manner.

For further details of the program controlling means 11 and the general operation thereof, see the aforementioned copending application as such details do not form a part of this invention other than that the program controlling means 11 is to be operated in a manner hereinafter described.

The ports 23–35 of the reading head 13 are adapted to be interconnected by suitable passageways formed in the reading head or block 13 and by suitable flexible conduits leading from the passageways of the reading head 13 to various actuators and a vacuum source of the system 10 in a manner now to be described.

As illustrated in FIGURE 1, the port 23 of the reading head 13 is interconnected to a controlling chamber 36' of an actuator 37 by a conduit means 36, the actuator 37 comprising a water valve which, when actuated, directs wash or rinse water into the dishwasher and, when deactuated, terminates the flow of water into the dishwasher.

In particular, when the inlet of a vacuum pump is interconnected to the port 23 by the program control member 15 in a manner hereinafter described, the controlling chamber 36' of the actuator 37 is evacuated whereby a flexible diaphragm or movable member 38 of the actuator 37 is drawn to the left in FIGURE 1 to cause the actuator 37 to direct water into the dishwasher. Thereafter, when air is permitted to return to the controlling chamber 35 under the control of the program controlling member 15 in a manner hereinafter described, either the natural resiliency of the diaphragm 38 or spring means or both causes the diaphragm or movable member 38 to move back to the right to terminate the actuation of the actuator 37 so that the water can no longer be directed into the dishwasher.

The ports 24, 28, 32, and 35 of the reading head 13 are respectively interconnected by branch conduit means 39, 40, 41 and 42 to a main conduit means 43 leading to the inlet of an electrically operated vacuum pump 44 whereby when the electric motor of the vacuum pump 44 is energized, the vacuum pump 44 tends to draw air in through the ports 24, 28, 32 and 35 at the reading surface 14.

Thus, when a series of blisters 20 of the reading sheet 17 are moved across the reading surface 14 of the reading head 13 in such a manner that the blisters 20 serially bridge the spacing between the ports 23 and 24 of the reading head 13, the vacuum pump 44 is adapted to impose a vacuum in the controlling chamber 36' of the actuator 37 to cause the actuator 37 to direct water into the dishwasher as long as the blisters 20 serially bridge the spacing between the ports 23 and 24, the series of blisters 20 being arranged relative to each other in such a manner that as one blister 20 begins to pass beyond the ports 23 and 24, another blister 20 comes into communication with the ports 23 and 24 whereby the controlling member 15 is adapted to interconnect together the ports 23 and 24 of the reading head 13 for a period of time as determined by the rate of rotation of the controlling member 15 and the number of the blisters 20 arranged in that particular location on the reading member 15.

Subsequently, when a venting channel 21 of the reading sheet 17 is brought into communication with the port 23, the vacuum port 24 is no longer interconnected to the port 23 and air is adapted to return to the controlling chamber 36' of the actuator 37 by being first filtered through the filtering means 19 of the reading member 15 and passing through the aperture 22 in the reading sheet 17 to enter the port 23 and deactuate the actuator 37 whereby the supply of water will be terminated until the vacuum port 24 is again interconnected to the port 23 in the manner previously described.

Thus, it can be seen that the program controlling member 15 of the program controlling means 11 of this invention is adapted to actuate the actuators of the system 10 in a desired sequence of operation and for desired periods of time to completely control the entire operation of the dishwasher.

In particular, the port 25 of the reading head 13 is interconnected to the controlling chamber 45 of an actuator 46 by a conduit means 47, the actuator 46 comprising an electrical switch with two fixed contacts 48 and 49 adapted to be bridged by a movable switch member 50 controlled by the movement of the operating member 51 of the actuator 46. For example, when a vacuum is imposed in the controlling chamber 45 of the actuator 46 by a blister 20 of the reading sheet 17 bridging the ports 24 and 25 of the reading head 13, the movable member 51 of the actuator 46 is moved to the left to cause the bridging member 50 to close against the contacts 48 and 49 to complete an electrical circuit through the switch 46. Conversely, when the actuator 46 is deactuated by air returning to the controlling chamber 45 of the actuator 46 by a venting channel means 21 of the reading sheet 17, the movable member 51 is moved back to the right to the position illustrated in FIGURE 1 whereby the flow of current through the actuator 46 is terminated.

The port 26 of the reading head 13 is interconnected to the controlling chamber 52 of an actuator 53 by a conduit means 54, the actuator 53 changing the direction of rotation of this spray nozzle of the dishwasher when the actuator 53 is actuated in the manner previously described and permitting the nozzle to rotate in the opposite direction when the actuator 53 is deactuated in the manner previously described.

The port 27 of the reading head 13 is interconnected to a chamber 55 of a selector valve 56 by a conduit means 57, the selector valve 56 having a rotatable member 58 controlled by a manually operated control knob 59 located on the dishwasher so that when the valve member 58 is disposed in the position illustrated in FIGURE 1, the port 27 is blocked from communication with the chamber 55 of the selector valve 56 whereby the program controlling means 11 of this invention will operate the wash cycles of the dishwasher at a rate sufficient to clean a heavy load of dishes or the like. However, when the movable member 58 of the selector valve 56 is moved in a position to cause a passage 60 of the movable member 58 to interconnect the conduit means 57 with the chamber 55 of the selector valve 56, the program controlling member 11 is operated in a manner hereinafter described to produce shortened wash cycles for a normal load of dishes whereby the total time of operation of the dishwasher will be less than the time which is required when a heavy load of dishes is to be washed.

The chamber 55 of the selector valve 56 is interconnected to a controlling chamber 61 of an actuator 62 by a conduit means 63 whereby the actuator 62 is adapted to be actuated when the movable member 58 of the valve 56 interconnects the port 27 with the chamber 55 to accomplish the above described feature in a manner hereinafter described.

The valve 56 carries a fitting 64 which has a fixed orifice 65 passing therethrough to interconnect the atmosphere with the chamber 55. However, the orifice 65 is so constructed and arranged that the same does not appreciably affect the operation of the actuator 62 as long as the vacuum pump 44 is imposing a vacuum in the chamber 55 of the valve 56 whereby the actuator 62 can be actuated in substantially a normal manner.

However, should the vacuum pump 44 be disconnected from the chamber 55 of the valve 56 and the chamber 55 not be be interconnected to the atmosphere through the program controlling member 15 in a manner hereinafter described, air will gradually enter the chamber 55 through the orifice 65 at a predetermined rate to cause deactuation of the actuator 62 at a predetermined rate for a purpose hereinafter described.

The port 29 of the reading head 13 in interconnected to the controlling chamber 66 of an actuator 67 by a conduit means 68, the actuator 67, when actuated, being adapted to dispense the first supply of detergent into the dishwasher.

Similarly, the port 30 of the reading head 13 is interconnected to the controlling chamber 69 of an actuator 70 by a conduit means 71, the actuator 70 dispensing the second supply of detergent in the dishwasher when the actuator 70 is actuated in the manner previously described.

The port 31 of the reading head 13 is interconnected to the controlling chamber 72 of an actuator 73 by a conduit means 74, the actuator 73 comprising an electrical switch that has two fixed contacts 75 and 76 and a movable member 77 for bridging the contacts 75 and 76 when the actuator 73 is actuated and for opening the contacts 75 and 76 when the actuator 73 is deactuated in the manner previously described.

The port 33 of the reading head 13 is also interconnected to the chamber 55 of the selector valve 56 by a conduit means 78 to cause actuation of the actuator 62 in a manner hereinafter described to control movement of the program controlling member 15 back to its starting position after the controlling means 11 has operated the system 10 through its entire cycles of operation.

The port 34 of the reading head 13 is interconnected to a controlling chamber 79 of an actuator 80 by a conduit means 81, the actuator 80 when activated opening a switch blade 82 which normally bridges fixed contacts 83 and 84 when the door of the dishwasher has been closed and has been latched to automatically start the operation of the system 10 in a manner hereinafter described.

A suitable electrical power source is provided for the system 10 of this invention and comprises lines $L_1$ and $L_2$, line $L_1$ being interconnected to the contact 83 while the line $L_2$ is interconnected to one side of a dishwasher motor 85 by a lead 86 and to one side of a heater element 87 of the dishwasher by a lead 88.

The other sides of the dishwasher motor 85 and heater element 87 are interconnected to the contact 49 of the actuator 46 by a lead 89.

The other contact 48 of the actuator 46 is interconnected by a lead 90 to the contact 84 of the locking means 82.

One side of the vacuum pump motor 44 is connected to the line $L_2$ by a lead 91 while the other side of the vacuum pump motor is connected to the lead 90 by the lead 92. Thus, when the switch blade 82 is closed by the user of the dishwasher latching the door thereof in the closed position to start the operation of the dishwasher, the blade 82 electrically connects the contacts 83 and 84 to place the vacuum pump motor 44 across the leads $L_1$ and $L_2$ to cause continuous operation of the vacuum pump 44 until the switch blade 82 is moved to the open position illustrated in FIGURE 1 by actuation of the actuator 80 in a manner hereinafter described.

A signal lamp 93 is also placed across the leads $L_2$ and 90 by leads 94 and 95.

In addition, a drain pump 96 for the dishwasher has one side of the electric motor thereof interconnected to motor 85 by a lead 97 and the other side of the motor thereof interconnected to the lead 90 by a lead 98. Thus, when the switch blade 82 is closed in the manner previously described, the drain pump 96 is operated.

The contact 76 of the actuator 73 is interconnected to the lead $L_2$ by a lead 99. The contact 75 of the actuator 73 is connected to one side of an electrical timer motor 100 for the program controlling member 15 by a lead 101, the other side of the timer motor 100 being interconnected to the lead 90 by a lead 102.

The timer motor 100 rotates the program controlling member 15 of this invention at a predetermined rate relative to the reading head surface 15 to cause operation of the dishwasher in a manner hereinafter described as long as the actuator 73 is actuated in a manner hereinafter described to cause the member 77 to electrically bridge the contacts 75 and 76.

The leads 99 and 101 respectively interconnected to the contacts 76 and 75 of the actuator 73 are respectively interconnected to fixed contacts 103 and 104 of a thermostatically operated switch 105 by leads 106 and 107, the contacts 103 and 104 being adapted to be closed by a thermostatically controlled member 108 which only bridges the contacts 103 and 104 when the temperature in the dishwasher exceeds a predetermined value in a manner hereinafter described.

As previously set forth, the timer motor 100 is adapted to rotate the program controlling member 15 of the controlling means 11 at a predetermined rate relative to the reading head surface 14.

In particular, it can be seen in FIGURE 6 that the timer motor 100 is adapted to drive a pinion gear 109 which is disposed in meshing relation with gear teeth 110 formed on the outer periphery of the backing member 18 of the program controlling member 15 in the manner provided in the aforementioned copending patent application. Thus, as long as the timer motor 100 is energized, the same is adapted to rotate the program controlling member 15 in a counterclockwise direction in FIGURE 6 at a predetermined rate to cause the program controlling member 15 to control the operation of the system 10 in a manner hereinafter described.

The controlling chamber 61 of the actuator 62 for changing the wash cycle time as well as for resetting the program controlling member 15 at its starting position, is defined by a collapsible and expansible bellows 111, FIGURES 6-8, having one end 112 thereof fixed to a support bracket 113 interconnected to stationary frame means 114, the frame means 114 also being interconnected to the reading head structure 12 by fastening members 115 and the like. In this manner, the other end 116 of the bellows 111 is adapted to move to the left in the manner illustrated in FIGURE 8 upon evacuation of the controlling chamber 61 in the manner previously described.

A lever or arm 117 has one end 118, FIGURE 3, telescopically and loosely receiving the shaft 16 of the program controlling member 15 whereby the lever 117 is adapted to be rotated relative to the shaft 16 without directly effecting movement of the program controlling member 15.

As illustrated in FIGURES 3 and 7, the lever 117 has a U-shaped portion 119 provided with two apertures 120 and 121 passing therethrough.

The movable end 116 of the bellows 111 is interconnected to the lever 117 by a clip 122 having one end 123 hooked through the aperture 120 of the lever 117 and the other end 124 thereof hooked through an eyelet portion 125 of the movable end 116 of the bellows 111.

Thus, when the bellows 111 is evacuated, the same moves to the left in the manner illustrated in FIGURE 8 to move the lever 117 to the left to the position illustrated in FIGURE 8 whereby such movement of the lever 117 will not effect operation of the program controlling member 15.

However, the free end 126 of the lever 117 pivotally carries a ratchet or pawl 127 by means of a pivot pin 128, the ratchet or pawl 127 having a tang end 129 cooperating with the gear teeth or the rack portion 110 of the program controlling member 15 so that the program controlling member 15 can be rotated in a counterclockwise direction in FIGURE 6 past the pawl or ratchet 127 without having the ratchet 127 prevent such movement.

The tang end 129 of the pawl 127 is urged toward the gear teeth 110 of the program controlling member 15 by a compression spring 130 operatively interconnected to the tang end 129 of the pawl 127 and to the lever 117 in any suitable manner.

A cylinder defining member 131 is carried by a bracket portion 132 of the frame means 114 and has a piston 133 disposed therein and operatively interconnected to the lever 117 by a clip means 134 having one end 135 thereof hooked through the aperture 121 in the lever 117 and the other end 136 thereof passing through the piston 133 and being provided with an enlargement so that the same cannot be pulled through the piston 133.

A coiled compression spring 137 is disposed in the cylinder defining member 131 between the bracket portion 132 and the piston 133 to tend to urge the lever 117 to the right in the manner illustrated in FIGURE 6 when the bellows 111 is deactuated.

Movement of the lever 117 in a counterclockwise direction by the compression spring 137 is limited by a rivet 138 and movement of the lever 117 in a clockwise direction in FIGURE 6 is limited by a rivet 139, the rivets 138 and 139 spacing a retainer member 140 above the plate portion 12 of the controlling means 11 in the manner illustrated in FIGURE 3 whereby the lever 117 passes between the plate 12 and the retainer 140.

Thus, the lever 117 is normally disposed in the position illustrated in FIGURE 6 until the controlling chamber 61 of the bellows 111 is evacuated by the program controlling member 15 in a manner hereinafter described to cause the movable end 116 of the bellows 111 to be moved to the left in the manner illustrated in FIGURE 8 until the lever 117 abuts against the rivet 139 in the manner illustrated in FIGURE 8.

As the lever 117 is moved from the position illustrated in FIGURE 6 to the position illustrated in FIGURE 8, the piston 133 is also moved to the left and compresses the spring 137. Such movement of the lever 117 to the left in the manner illustrated in FIGURE 8 does not cause the pawl or ratchet 127 thereof to affect the predetermined rate of counterclockwise rotation of the program controlling member 15 by the timer motor 100.

However, when the bellows 111 is deactuated in the manner hereinafter described to permit air to return to the controlling chamber 61 thereof, the movable end 116 of the bellows 11 is adapted to be drawn back to the right by the force of the compression spring 137 whereby the force of the compression spring 137 also causes the lever 117 to move back to the right until the same abuts against the rivet 138 in the manner illustrated in FIGURE 6.

However, as the lever is being returned back to the right, the tang end 129 of the pawl or ratchet 127 interlocks with the gear teeth 110 of the program controlling member 15 and moves the same therewith at a rate substantially faster than the normal rate of movement of the program controlling member under the influence of the motor 100, the pinion gear 109 of the motor 100 having suitable clutching means to permit the ratchet or pawl 127 to override the same to rapidly move the program controlling member 15 in a counterclockwise direction in FIGURE 6 at a rate faster than that normally produced by the pinion gear 109 of the timer motor 100.

In this manner, the actuator 62 of this invention is not only adapted to shorten the normal predetermined actuation time of a particular actuator of the system 10 but also the actuator 62 of this invention is adapted to automatically return the program controlling member 15 to its starting position after the program controlling member 15 has completed the complete operation cycles of the system 10 and has turned off the vacuum pump 44 and timer motor 100.

Such features will be more appparent upon the following detailed description of the operation of the system 10 of this invention.

First, assume that the program controlling member 15 is initially disposed in the position illustrated in FIGURE 5 relative to the ports 23-35 in the reading head 15 whereby a blister 20 is bridging the ports 31 and 32 of the reading head 13 so that the actuator 73 of the system 10 would have the contacts 75 and 76 thereof electrically bridged by the member 77 if the vacuum pump 44 were operating.

The user then fills the dishwasher with the desired quantity of dishes and then determines whether the load in the dishwasher is one which would require normal wash cycles or heavy wash cycles. If the user desires a heavy load wash cycles, she merely turns the selecting knob 59 to the "heavy load" position whereby the movable member 58 of the valve structure 56 will be disposed in the position illustrated in FIGURE 1 to prevent communication between the conduit means 57 and the chamber 55 of the valve structure 56 whereby the actuator 62 of this invention will not be actuated at times when the program controlling member 15 has blisters 20 bridging the ports 27 and 28.

However, if the housewife determines that the load of dishes only requires a normal wash cycle, she turns the selector knob 59 to the "normal load" position thereof whereby the passage 60 of the movable member 58 will be disposed in a position to interconnect the conduit means 57 with the chamber 55 of the valve 56 so that the actuator 62 will be actuated when the blisters 20 of the program controlling member 15 bridges the ports 27 and 28 in a manner hereinafter described.

Thereafter, the user merely fills the detergent dispensers with the desired detergent and closes the door of the dishwasher.

Subsequently, she either pushes the actuation button on the dishwasher, or, by means of an automatic push button control when the latch of the door is closed, the switch blade 82 is moved to a position to bridge the contacts 83 and 84 to not only place the vacuum pump motor 44 and signal lamp 93 across the leads $L_1$ and $L_2$ but also to place the drain pump motor 96 across the leads $L_1$ and $L_2$ to cause operation of the same.

Since a blister 20 of the program controlling member 15 is initially bridging the ports 31 and 32 when the switch blade 82 is closed, the now operating vacuum pump 44 is adapted to evacuate the controlling chamber 72 of the actuator 73 to cause the member 77 to bridge the contacts 75 and 76 to place the timer motor 100 across the leads $L_1$ and $L_2$ whereby the program controlling member 15 is rotated in a counterclockwise direction as illustrated in FIGURE 5 in the manner previously described at a predetermined rate.

Figure 2:
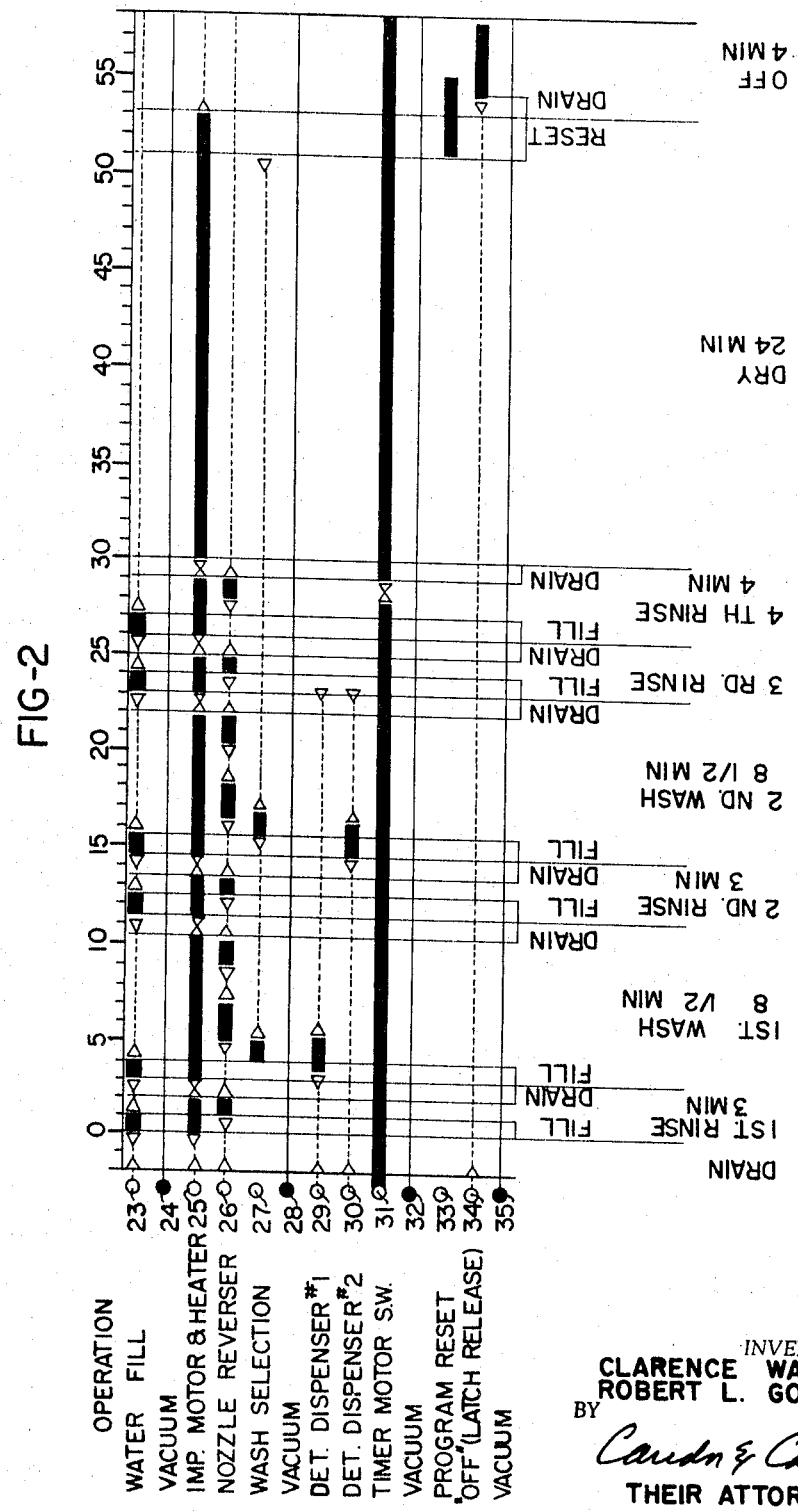
FIGURE 2 is a schematic diagram illustrating the sequence in the operating of the system illustrated in FIGURE 1.

As illustrated in FIGURE 2, the blisters 20 and vent channels 21 are so arranged on the reading sheet 17 at its starting position that it can be seen that the ports 23, 25, 26, 29, 30 and 34 are all respectively interconnected to vent channel means 21 whereby the actuators 37, 46, 53, 61, 67 and 70 are maintained in their deactuated positions.

As the timer motor 100 rotates the program controlling member 15 in a clockwise direction for an initial period of about two minutes, the operating drain pump 96 drains all of the remaining water out of the compartment of the dishwasher.

However, after two minutes have elapsed, the program member 15 is so disposed relative to the ports 23–35 in the reading head 13, as indicated by the zero position in FIGURE 2, that an elongated blister 20 bridges the ports 23, 24 and 25 to simultaneously actuate actuators 37 and 46.

When the actuator 37 is actuated, it causes rinse water to enter the dishwasher for a period of approximately one minute whereby a vent blister 21 is again brought into communication with the port 23 by the moving program controlling member 15 to deactuate the actuator 37.

At the same time that the actuator 37 is actuated, the actuator 46 is actuated to cause the member 50 to bridge the contacts 48 and 49 thereof to place the dishwasher motor 85 and heater 87 across the leads $L_1$ and $L_2$ for a period of approximately two minutes at which time the moving program controlling member 15 brings a vent channel 21 again into communication with the port 25 to deactuate the actuator 46 and terminate operation of the motor 85 and heater 87.

After the program controlling member 15 has filled the dishwasher with rinse water for a period of about one minute, the actuator 37 is deactuated and a series of blisters 20 of the program controlling member bridges the ports 24, 25 and 26 to continue to cause actuation of the actuator 46 while causing initial actuation of the actuator 53 to permit the spray nozzle of the dishwasher to rotate in the opposite direction from its normally rotating position.

After the two minute period of the rotation of the program controlling member 15, it can be seen in FIGURE 2 that the actuator 46 is deactuated at the same time that the actuator 53 is deactuated so that the motor 85, heater 87 and nozzle reversing means 53 will not operate for a period of a minute during which time the drain pump 96 empties the dishwasher.

At the three minute period of operation of the program controlling member 15 as illustrated in FIGURE 2, the actuator 37 and actuator 46 are again actuated to fill the dishwasher with water and to operate the motor 85 and heater 87.

At the three and a half minute period of operation, the program controlling member 15 has a blister 20 bridging the ports 28 and 29 to cause actuation of the actuator 67 to dispense the first supply of detergent into the dishwasher, such actuation of the actuator 67 lasting for approximately two minutes at which time the port 29 is against vented to the atmosphere to deactuate the actuator 67.

At the four minute interval of the operation illustrated in FIGURE 2, the water valve actuator 37 is deactivated while operation of the motor 85 and heater 87 is continued until the ten minute period has been reached.

During the interval of the first wash cycle as disposed between the three minute period and eleven and a half minute period illustrated in FIGURE 2, the nozzle reverser actuator 53 is adapted to be actuated twice as illustrated in FIGURE 2.

Also, it can be seen in FIGURE 2 that at the four minute interval, a blister 20 of the program controlling member 15 is adapted to bridge the ports 26, 27 and 28 of the reading head 13 to interconnect the vacuum pump 44 to the conduit means 57 reading to the selector valve 56. Therefore, if the member 58 of the selector valve 56 is disposed in the heavy wash cycle position thereof, it can be seen that the vacuum pump 44 will not be connected to the controlling chamber 61 of the actuator 62 so that the program controlling member 15 will cause the eight and a half minute wash cycle as illustrated in FIGURE 2.

However, if the selector knob 59 has been disposed in its normal wash load position, the member 58 is disposed in such a position that the vacuum pump 44 is adapted to be interconnected to the chamber 55 of the selector valve 56 at the four minute period illustrated in FIGURE 2 to cause evacuation of the controlling chamber 61 of the bellows 111. Thus, the movable end 116 of the bellows 111 is moved to the left to the position illustrated in FIGURE 8 to cause the lever 117 to move the pawl 127 to the position illustrated in FIGURE 8. The pawl 127 is held in that position for approximately one minute whereby a vent channel 21 of the program controlling member 15 is then disposed in communication with the port 27 to cause deactuation of the bellows 111.

When the bellows 111 is deactuated in the above manner, the compressed spring 157 rapidly moves the lever 117 from the position illustrated in FIGURE 8 back to the position illustrated in FIGURE 6 whereby the pawl 127 causes rapid advancement of the program controlling member independently of the operation of the timer motor 100 so that the entire wash cycle disposed between the three minute period and the eleven and a half minute period illustrated in FIGURE 2 will be cut down to be only approximately four minutes instead of the eight and a half minutes shown for a heavy load wash cycle.

During the last minute of the first wash cycle, the actuator 46 is deactuated to terminate operation of the motor 85 and heater 87 whereby the drain pump 96 can drain the dishwasher.

Thereafter, the dishwasher is operated through a second rinse cycle for approximately three minutes as illustrated in FIGURE 2. Thereafter, a second wash cycle is provided in the manner previously described, the second wash cycle either being eight and a half minutes if the selector knob 59 is disposed in the heavy load wash cycle position or will be four minutes if the selector knob 59 is disposed in the normal load wash cycle, the second detergent actuator 70 being actuated at the fourteen and a half minute position in FIGURE 2 by the vacuum pump 44 being interconnected to the port 30 of the reading head in the manner previously described.

After the second wash cycle, there is a three minute wash cycle as illustrated in FIGURE 2 followed by a four minute rinse cycle.

Up and to the twenty-seven and a half minute operation of the system 10, the ports 31 and 32 have been continuously interconnected together to maintain actuation of the actuator 73 so that the timer motor 100 is placed along the leads $L_1$ and $L_2$ to continuously drive the program controlling member 15 in a counterclockwise direction.

However, at the twenty-seven and a half minute period, the port 31 of the reading head 13 is interconnected to a vent channel 21 of the program member 15 to cause deactuation of the actuator 73, and thus, deenergization of the timer motor 100 whereby the movement of the program controlling member 15 is terminated.

However, the motor 85 and heater 87 of the system 10 are operating at this time and as the heater 87 builds up the temperature in the dishwasher, the same reaches a predetermined point whereby the thermostat member 108 of the actuator 105 bridges the contacts 103 and 104 to again energize the timer motor 100 to cause the program controlling member to again continue to move in a counterclockwise direction whereby blisters 20 of the controlling member 15 will again bridge the ports 31 and 32 in the reading head 13 to again cause actuation of the actuator 73, the blisters 20 of the program controlling member 15 being so constructed and arranged that the same will continuously interconnect the ports 31 and 32 regardless of the position of the program controlling member 15 until the same again reaches the twenty-seven and a half minute position as illustrated in FIGURE 2.

After the fourth rinse cycle, the program controlling member 15 only actuates the actuator 46 and 73 during a tweny-four minute drying period.

However, at the fifty-one minute period illustrated in FIGURE 2, blisters 20 of the program controlling member 15 bridge the ports 32 and 33 to impose a vacuum in the controlling chamber 61 of the bellows 111 to again cause the lever 117 to be moved to the left to the position illustrated in FIGURE 8 and be held in such position until the fifty-five minute period illustrated in FIGURE 2.

However, before the fifty-five minute period, the actuation of the actuator 46 is terminated at the fifty-two minute period by having a vent channel means 21 of the program controlling member interconnected to the port 25 in the reading head 13.

Also, at the fifty-four minute period, blisters 20 of the program controlling member 15 bridge the ports 34 and 35 to impose a vacuum in the controlling chamber 79 to cause opening of the switch blade 82 whereby the operation of all of the electrical devices of the system 10 is terminated.

Thus, the timer motor 100 is deenergized whereby further movement of the program control member 15 is prevented.

However, since the calibrated leak or orifice 65 of the fitting 64 in the selector valve 56 controls the return of air to the chamber 61 of the bellows 111, the bellows 111 progressively fills with air whereby the spring 137 is adapted to move the lever 117 back to the right to the position illustrated in FIGURE 6 to cause further advancement of the program controlling member 15 in a clockwise direction, such clockwise movement of the program controlling member 15 being as rapid as the filling of the bellows 111 by air whereby when the lever 117 is returned back to the position illustrated in FIGURE 6, the same has advanced the program controlling member 15 back to its initial starting position illustrated in FIGURE 5 whereby the program controlling member 15 is now disposed in a position to again operate the system 10 in the manner previously described when the user again manually closes the switch blade 82 by suitable button or latch means in the manner previously described.

Therefore, it can be seen that an improved program control system has been provided by this invention as well as an improved method for controlling such a system or the like.

In addition, improved parts and method of operating the same have been provided for the system 10 of this invention as well as for other program control systems or the like.

While the actuator 62 of this invention has been described in connection with overriding the motor means 100 of the program control member 15 to selectively vary the length of time of a wash cycle of the system 10, it is to be understood that the same can be utilized for selectively varying any other cycle of the system 10 or other system as desired.

Further, while the actuator 62 has been described as operating both to reduce a predetermined period of actuation of one actuator of the system 10 as well as to provide the means for automatically returning the program controlling member 15 to its starting position after the completion of the operating cycle, it is to be understood that such actuator 62 can be utilized for just one of these features if desired.

In addition, while the fixed orifice 65 of this invention has been described in connection with the selector valve 56 to provide means for controlling the deactuation time of an actuator without requiring the vent means of the program controlling member 15 to deactivate the previously actuated actuator, it is to be understood that such calibrated leaf or orifice means of this invention can be utilized with any other of the actuators of the system 10 to provide means for deactuating the same without requiring the program controlling member 15 to control the deactuation of such an actuator.

While the form of the invention now preferred has been disclosed as required by statute, other forms may be used, all coming within the scope of the claimed subject matter which follows.

What is claimed is:

1. A method for controlling the operation of a plurality of actuators in a predetermined pattern comprising the steps of providing a program controlling member, moving said program controlling member at a predetermined rate by a moving means to actuate each of said actuators for a predetermined time, and rapidly moving said program controlling member at a rate faster than said predetermined rate with an overriding means to decrease said predetermined time of actuation of one of said actuators even though said moving means is still tending to move said program controlling member at said predetermined rate, said last-named step comprising the step of pneumatically operating a pneumatic actuator that defines at least part of said overriding means with the stroke means of said pneumatic actuator providing said overriding movement to said program member.

2. A method as set forth in claim 1 and including the step of causing said overriding means to return said program controlling member to its starting position after the end of said predetermined pattern.

3. A method as set forth in claim 1 and including the step of controlling the operation of said overriding means with said program controlling member.

4. A method as set forth in claim 1 and including the step of operating said overriding means with one of said actuators.

5. A method as set forth in claim 1 and including the step of providing a pneumatic source, and actuating said first-named actuators by sequentially interconnecting said source to said actuators by movement of said program controlling member.

6. A method as set forth in claim 5 and including the step of operating said overriding pneumatically operated actuator by interconnecting said source thereto.

7. A method as set forth in claim 6 and including the steps of providing selector means, and setting said selector means in one position thereof to interconnect said source from said program controlling member to said overriding pneumatically operated actuator.

8. A method as set forth in claim 7 and including the step of providing means for bypassing said selector means so that said program controlling member can interconnect said source to said overriding pneumatically operated actuator after the end of said predetermined pattern to cause said overriding means to return said program controlling member to its starting position.

9. A method as set forth in claim 1 and including the step of causing said first-named actuators to control the operation of a washing apparatus.

10. A method as set forth in claim 1 and including the steps of using one of said actuators to control the wash cycle of a washing apparatus, actuating said one actuator for a predetermined period of time by said program controlling member being moved by said moving means to provide a relatively long wash cycle, and selectively changing the length of said wash cycle by overriding said moving means with said overriding means to decrease the time of actuation of said one actuator to provide a relatively short wash cycle.

References Cited

UNITED STATES PATENTS

| | | | |
|---|---|---|---|
| 2,827,767 | 3/1958 | Hill | 137—624.18 X |
| 3,033,999 | 5/1962 | Thornberry et al. | 307—141.4 |
| 3,074,431 | 1/1963 | Schwartz et al | 137—624.18 X |
| 3,124,042 | 3/1964 | Mahan | 137—624.18 X |
| 3,216,326 | 11/1965 | Rice et al. | 137—624.18 X |
| 3,237,529 | 3/1966 | Beck et al. | 137—624.18 X |
| 3,237,644 | 3/1966 | Beck et al. | 137—624.18 |
| 3,260,866 | 7/1966 | Martin | 307—141 |
| 3,284,589 | 11/1966 | Golden et al. | 137—624.18 X |
| 3,296,465 | 1/1967 | Knerr | 307—141 |
| 3,151,257 | 9/1964 | Anderson | 307—141.4 |

ROBERT K. SCHAEFER, *Primary Examiner.*

T. B. JOIKE, *Assistant Examiner.*

U.S. Cl. X.R.

137—624.18; 200—46